United States Patent
Shaw et al.

(10) Patent No.: US 9,249,031 B2
(45) Date of Patent: Feb. 2, 2016

(54) REUSE OF PAINT-SATURATED ALKALINE EARTH METAL CARBONATES

(71) Applicant: J.M. Huber Corproation, Atlanta, GA (US)

(72) Inventors: Lane George Shaw, Milton, GA (US); Anthony Craig Gentile, The Woodlands, TX (US)

(73) Assignee: J.M. Huber Corporation, Atlanta, GA (US)

( * ) Notice: Subject to any disclaimer, the term of this patent is extended or adjusted under 35 U.S.C. 154(b) by 143 days.

(21) Appl. No.: 13/923,521

(22) Filed: Jun. 21, 2013

(65) Prior Publication Data

US 2014/0377559 A1    Dec. 25, 2014

(51) Int. Cl.
*B02C 19/00*   (2006.01)
*C01F 11/18*   (2006.01)
*B01D 46/00*   (2006.01)
*B09B 3/00*    (2006.01)

(52) U.S. Cl.
CPC .............. *C01F 11/185* (2013.01); *B01D 46/00* (2013.01); *B02C 19/0056* (2013.01); *B09B 3/00* (2013.01); *C01P 2004/61* (2013.01); *Y10T 428/2982* (2015.01)

(58) Field of Classification Search
CPC ... C01F 11/185; B02C 19/0056; B02C 19/00; C01P 2004/61; B09B 3/00; B01D 46/00; Y10T 428/2982

USPC ...................................... 241/22, 30; 428/402
See application file for complete search history.

(56) References Cited

U.S. PATENT DOCUMENTS

2014/0287185 A1    9/2014    Moseley et al.

FOREIGN PATENT DOCUMENTS

EP    1793032 A1    6/2007
GB    2450888 A     1/2009

OTHER PUBLICATIONS

International Search Report and Written Opinion for PCT/US2014/038556 mailed Mar. 19, 2015.

*Primary Examiner* — Mark Rosenbaum
(74) *Attorney, Agent, or Firm* — Sutherland Asbill & Brennan LLP

(57) ABSTRACT

Methods are provided for beneficially reusing a paint-saturated filter aid, such as paint-saturated alkaline earth metal carbonates, as a substitute in applications requiring virgin alkaline earth metal carbonates. The paint-saturated filter aid is prepared by re-milling paint-saturated filter aid to a predetermined size to produce re-milled particles suitable for reuse in a variety of applications, including flooring, concrete, and the like. Also provided are flooring materials including re-milled particles of a paint-saturated filter aid characterized by one or more of: a median particle size (D50) of about 1 to about 50 microns; less than about 5% of the re-milled particles being retained on a 200 mesh screen; or a top cut size (D90) of about 5 to about 300 microns.

13 Claims, No Drawings

REUSE OF PAINT-SATURATED ALKALINE EARTH METAL CARBONATES

BACKGROUND

The present application relates generally to a process for converting paint-saturated alkaline earth metal carbonates into a reusable material. In particular, a process is provided for re-milling paint-saturated alkaline earth metal carbonates obtained from overspray paint systems that are suitable for use in the manufacture of products not requiring a pure, bright white calcium carbonate.

Alkaline earth metal carbonates, such as calcium carbonates, are used as particulate filter media in a variety of industrial processes. For example, alkaline earth metal carbonates recently have been employed as a filter aid to capture paint booth overspray, such as during the spray painting of new automobiles. See e.g., U.S. Pat. Nos. 7,959,722 and 8,241,406.

In such paint overspray systems, the alkaline earth metal carbonates typically are fluidized so as to thoroughly mix with and adsorb paint overspray particles. Because of the high surface area of the particulate alkaline earth metal carbonates, the individual paint particles wet the surfaces of the alkaline earth metal carbonates and form agglomerates of the paint-saturated alkaline earth metal carbonates, in turn reducing the effective surface area of the alkaline earth metal carbonates and preventing proper fluidization. The paint-saturated alkaline earth metal carbonates then are captured for disposal, which currently is limited to landfills (both alone and as an absorbent for hazardous liquids) or use as a fill material in concrete and cement-based materials.

Accordingly, there is a need for a simple process that converts paint-saturated alkaline earth metal carbonates into a form that can be beneficially reused in various applications, particularly applications in which recycled materials are desired.

SUMMARY

Embodiments of the present description include a process for converting paint-saturated filter aid into a form suitable for reuse in various applications, thereby reducing the amount of waste disposed in landfills. In particular, processes are provided for converting the paint-saturated filter aid into a form suitable for use as a filter media or in other applications as a substitute for materials, such as alkaline earth metal carbonates, in which non-color sensitive recycled materials are desired, particularly flooring applications (i.e., carpet backing and vinyl flooring), adhesives, concrete, and the like.

The methods for reusing filter aid include providing paint-saturated filter aid and re-milling the paint-saturated filter aid to a predetermined size to produce re-milled particles. The paint-saturated filter aid may be re-milled alone or co-milled in combination with a second material.

In another aspect, a method of reusing paint-saturated filter aid includes providing paint-saturated filter aid; co-milling the paint-saturated filter aid with a second material to provide re-milled particles useful in the manufacture of carpet; and manufacturing a new carpet containing the re-milled particles.

In another aspect, a flooring material is provided including re-milled particles of a paint-saturated filter aid characterized by one or more of: a median particle size (D50) of about 1 to about 50 microns; less than about 5% of the re-milled particles being retained on a 200 mesh screen; or a top cut size (D90) of about 5 to about 300 microns.

DETAILED DESCRIPTION

Methods for reusing paint-saturated filter aid are provided to address the above-described needs. The methods generally include re-milling paint-saturated filter aid to a predetermined size to produce re-milled particles. Advantageously, the re-milled particles are suitable for reuse as a filter media to capture paint overspray or in other types of applications in which the recycled filter aid would be suitable, particularly in carpet backing, vinyl flooring, adhesives, concrete, and the like.

The paint-saturated filter aid may be obtained from the spent filter aid of overspray paint systems, such as the Eco-DryScrubber (Dürr Systems GmbH, Germany). The overspray paint systems are used primarily in automotive manufacturing processes. The overspray paint systems generally include a hopper with the filter aid, filter elements, and an air duct for filtered air. The paint overspray enters the overspray paint system via an exhaust air flow. A filter aid is periodically deposited on the filter elements to protect the filter elements from clogging the filter elements. The filter aid also may be periodically discharged into the exhaust air flow upstream of the filter elements to capture paint overspray particles in the exhaust air before being captured on the filter element.

The filter aid adsorbs the paint overspray and becomes saturated, causing the paint-saturated filter aid to agglomerate, decreasing the effective surface area of the paint-saturated filter aid, and rendering the paint-saturated filter aid too large to be readily fluidized. The paint-saturated filter aid is blown off the filter element, removed from the filtering system, and collected and converted into a form suitable for reuse.

"Filter aid", as used herein, includes ground alkaline earth metal carbonates suitable for use in overspray paint applications. Non-limiting examples of suitable alkaline earth metal carbonates include calcium carbonate. Preferably, the filter aid includes calcium carbonate particles that are prepared from high purity calcium carbonate, particularly calcium carbonate of sedimentary origin, that is characterized as readily breaking into fine particles. Non-limiting examples of calcium carbonates which are of sedimentary origin includes oolites, petroids, chalks, limestones, and marbles of both calcitic and aragonitic crystal forms.

The filter aid generally is in the form of fine particles having a high surface area. For example, prior to its use, the particles of filter aid have a median particle size (D50) of about 5 to 30 microns, preferably from about 8 to about 25 microns. The particles of filter aid may be further characterized as having one or more of the following properties: a top cut (D90) from about 20 to about 90 microns; a chemical purity level of greater than about 90% by weight alkaline earth metal carbonate (preferably greater than about 90% by weight calcium carbonate); and a moisture level of less than about 0.2% by weight.

The "paint-saturated filter aid", as used herein, refers to particles of filter aid to which the paint overspray has adsorbed. The paint-saturated filter aid may be characterized by one or more of the following properties: the relative effective surface area of the particles of paint-saturated filter aid (i.e., as compared to the starting relative effective surface area of the particles of filter aid), the median particle size (D50) of the particles of paint-saturated filter aid, or the moisture content or paint content of the particles of paint-saturated filter aid.

In embodiments, the particles of paint-saturated filter aid may have an effective surface area less than about 50% of the starting effective surface area of the particles of filter aid, less than about 35% of the starting effective surface area of the particles of filter aid, or less than 20% of the starting effective surface area of the particles of filter aid. In embodiments, the particles of paint-saturated filter aid have a median particle size (D50) from about 40 to about 100 microns, from about 40 to about 80 microns, or from about 40 to about 70 microns. In embodiments, the particles of paint-saturated filter aid may have a moisture level of greater than about 0.3% by weight. In embodiments, the particles of paint-saturated filter aid may have a paint content from about 1 to about 5% by weight.

The paint-saturated filter aid is processed to make it suitable for reuse by re-milling the paint-saturated filter aid to produce re-milled particles of a predetermined size. Methods of re-milling include methods known in the art for drying and reducing the size of particles, non-limiting examples of which include roller mills, hammer mills, impact mills, centrifugal mills, jet mills, media mills, and the like.

In embodiments, the paint-saturated filter aid may re-milled alone or co-milled in combination with one or more other materials. For example, in embodiments the re-milling comprises blending and co-milling the paint-saturated filter aid with a virgin or post-industrial alkaline earth metal carbonate. In embodiments, the re-milling comprises blending and co-milling the paint-saturated filter aid with a virgin calcium carbonate, a post-industrial calcium carbonate, or a combination thereof. The re-milled particles also may be combined with one or more other materials after re-milling the paint-saturated filter aid to provide a composite material. However, it is believed that blending and co-milling the paint-saturated filter aid with one or more other materials is particularly effective because it provides additional surface area onto which the thicker paint films in the paint-saturated filter aid can be spread by the shear of the re-milling, thereby improving the functionality of the resulting re-milled particles.

The paint-saturated filter aid and one or more other materials may be combined at a ratio from about 1:5 to about 5:1, from about 2:3 to about 3:2, or about 1:1. For example, in embodiments the paint-saturated filter aid is from about 20% to about 100% by weight of the re-milled particles or composite material, from about 20% to about 80% by weight of the re-milled particles or composite material, or from about 40% to about 60% by weight of the re-milled particles or composite material.

The re-milling may be performed at the same location from which the paint-saturated filter aid is collected or may be performed after transporting the paint-saturated filter aid to a separate location. Accordingly, the method may further include collecting the paint-saturated filter aid from a manufacturer that produces the paint-saturated filter aid as a waste product in its processes and transporting the paint-saturated filter aid to a separate facility to be converted into the re-milled particles or a composite material comprising the re-milled particles.

The re-milled particles may be characterized by one or more of the following properties: the median particle size (D50) of the re-milled particles, the top cut size (D90) of the re-milled particles, or the amount of re-milled particles retained on a mesh screen. In embodiments, the re-milled particles have a median particle size (D50) of about 1 to about 50 microns, about 1 to about 25 microns, or about 5 to about 25 microns. In embodiments, less than about 50% of the re-milled particles are retained on a 200 mesh screen, less than about 25% of the re-milled particles are retained on a 200 mesh screen, or less than 5% of the re-milled particles are retained on a 200 mesh screen. In embodiments, the re-milled particles have a top cut size (D90) of about 5 to about 300 microns, about 10 to about 200 microns, or about 15 to about 100 microns.

The re-milled particles also may be characterized by the moisture or paint content of the re-milled particles. For example, the re-milled particles may have a moisture content of less than or equal to about 0.2% by weight or a paint content of about 1 to about 5% by weight. Because the paint is adsorbed onto the paint-saturated filter aid, the re-milling of the paint-saturated filter aid generally will not significantly decrease the paint content of the re-milled particles from that in the paint-saturated filter aid.

The re-milled particles are suitable for reuse in a variety of applications that do not require the whiteness usually obtained when using ground alkaline earth metal carbonates, such as calcium carbonate. For example, the re-milled particles may be used in various flooring applications, non-limiting examples of which include carpet backing and as a vinyl flooring substrate. The re-milled particles also may be used as a beneficial partial replacement of cement in concrete. The re-milled particles also may be reused as a filter aid, for example, in the paint overspray systems as the processing of the paint-saturated filter aid at least partially restores the effective surface area of the filter aid and removes excess moisture.

In an exemplary embodiment, the re-milled particles are used in the manufacture of carpet to satisfy the increasing desire to incorporate recycled content into both broadloom carpet and carpet tiles. For example, initiatives including the U.S. Green Building Council's Leadership in Energy and Environmental Design® (LEED) promote the use of recycled content in construction products. Accordingly, in embodiments the re-milled particles are present in the carpet and/or the carpet backing in an amount sufficient for the carpet and/or carpet backing to qualify for at least one point towards certification under standards set by Leadership in Energy and Environmental Design® or NSF Standard 140.

Particle sizes specified herein may be measured using well-known methods employed in the art of diffraction laser particle size analysis (e.g., using a Cilas® Particle Size Analyzer manufactured by Cilas Particle Size Company, Madison, Wis.), or in the case of the screen measurement, wet wash (ASTM C-110, Standard Test Methods for Physical Testing of Quicklime, Hydrated Lime and Limestone) or jet sieving (e.g., using a Micron Air Jet Sieve manufactured by Hosokawa Micron Powder Systems, Summit, N.J.).

The present description is further illustrated by the following non-limiting examples. Unless otherwise indicated, percentages are by weight, temperature is in degrees Celsius or is at ambient temperature, and pressure is at or near atmospheric.

EXAMPLES

Limestone powder was fed from two bulk silos sitting on weight load cells. A paint-saturated limestone powder in Silo #1 was added at 50% to the roller mill along with 50% of virgin feed from Silo #2. The paint-saturated limestone powder had a median particle size (D50) of 50 microns, a paint content of 3.5%, and a moisture content of 0.35%. The virgin feed was a limestone powder with a median particle size (D50) of 22 microns. Both materials were passed through a No. 5 Package Direct Air, gas fired air heater to heat and dry the incoming material before it was fed to the roller mill (Raymond Model 5488 High Side 54").

The roller mill was an air swept vertical ring-roll with an integral classification system. A vertical shaft rotated a "spider" assembly of arms from which were suspended free swinging journal assemblies with rolls attached. As the unit turned, centrifugal force drove the rolls against the inner surface of the vertical grinding ring. Plows rotating with the assembly lifted feed material from the mill bottom and directed it between the rolls and the grinding ring where it was pulverized.

A Model No. 9 cyclone (Combustion Engineering, a Division of Raymond) was used to classify the final product from the oversize. The exit temperature from the mill was 65° C. The air entered from below the grinding rings and flowed upward, carrying fines to the classifying section. The classifier sized the pulverized material and returned oversized particles to the grinding chamber for further processing. The mill operated under negative pressure conditions.

The pulverized material was analyzed using ASTM C-110, Standard Test Methods for Physical Testing of Quicklime, Hydrated Lime and Limestone to measure the particle size, particle size distribution, and moisture level. The results of each Example are summarized in the following tables.

Example 1

| Cilas MPS | D90 (microns) | % 325 mesh | Moisture (%) |
|---|---|---|---|
| 6.95 | 22.62 | 0.0024 | 0.02 |
| 8.55 | 23.15 | 0.0027 | 0.04 |
| 8.53 | 23.54 | 0.0026 | 0.04 |
| 9.3 | 23.91 | 0.0024 | 0.02 |

Example 2

| Cilas MPS | D90 (microns) | % 325 mesh | Moisture (%) |
|---|---|---|---|
| 10.14 | 21.47 | 0.023 | |
| 9.76 | 20.68 | 0.0108 | |
| 9.57 | 19.64 | 0.0048 | 0.02 |
| 9.02 | 18.44 | 0.005 | 0.03 |
| 8.86 | 18.2 | 0.0039 | 0.03 |
| 8.81 | 18.11 | 0.0031 | |

As can be seen from the foregoing, the re-milling of the composite material provided powdered calcium carbonate having a median particle size (D50) between 6.95 and 10.14 microns, a top cut size (D90) from 18.11 to 23.91 microns, and a moisture content from 0.02 to 0.04% by weight. For example, calcium carbonate used in a NSF-140 certified carpet backing application may have a median particle size D(50) of 5.5 to 10.0 microns, a top cut size (D90) of 15 to 21 microns, and a moisture content of less than 0.1% by weight.

It is intended that the foregoing detailed description be regarded as illustrative, rather than limiting, and that it be understood that it is the following claims, including all equivalents, which are intended to define the scope of this invention.

What is claimed is:

1. A method for reusing paint-saturated filter aid comprising:
    providing paint-saturated filter aid comprising a filter aid, wherein the filter aid comprises milled alkaline earth metal carbonate; and
    re-milling the paint-saturated filter aid to a predetermined size to produce re-milled particles.

2. The method of claim 1, wherein the step of re-milling the paint-saturated filter aid comprises blending and co-milling the paint-saturated filter aid with a second material.

3. The method of claim 2, wherein the paint-saturated filter aid and second material are present in a ratio from about 1:5 to about 5:1.

4. The method of claim 2, wherein the paint-saturated filter aid and second material are present in a ratio from about 2:3 to about 3:2.

5. The method of claim 2, wherein the second material comprises virgin calcium carbonate, post-industrial calcium carbonate, or a combination thereof.

6. The method of claim 1, wherein the milled alkaline earth metal carbonate comprises calcium carbonate.

7. The method of claim 1, further comprising blending the re-milled particles with a second material to provide a composite material useful in the manufacture of carpet, vinyl flooring, or concrete.

8. The method of claim 7, wherein the second material comprises virgin calcium carbonate, post-industrial calcium carbonate, or a combination thereof.

9. The method of claim 1, wherein the predetermined size of the re-milled particles is characterized by one or more of the following:
    a median particle size (D50) of about 1 to about 50 microns;
    less than about 50% of the re-milled particles are retained on a 200 mesh screen; or
    a top cut size (D90) of about 5 to about 300 microns.

10. The method of claim 1, wherein the predetermined size of the re-milled particles is characterized by one or more of the following:
    a median particle size (D50) of about 1 to about 25 microns;
    less than about 5% of the re-milled particles are retained on a 200 mesh screen; or
    a top cut size (D90) of about 15 to about 100 microns.

11. The method of claim 1, wherein the re-milled particles have a moisture content of less than or equal to about 0.2% by weight.

12. The method of claim 1, wherein the paint-saturated filter aid comprises from about 1 to about 5% by weight paint.

13. The method of claim 1, wherein providing the paint-saturated filter aid comprises:
    collecting the paint-saturated filter aid from one or more manufacturers using the filter aid in a paint overspray filter; and
    transporting the paint-saturated filter aid from the one or more manufacturers to a separate treatment facility.

\* \* \* \* \*